3,759,840
CATALYST FOR HYDROCARBON OXIDATION
Robert S. Barker, Little Ferry, N.J., assignor to
Halcom International, Inc.
No Drawing. Filed Sept. 28, 1970, Ser. No. 76,249
Int. Cl. B01j *11/82*
U.S. Cl. 252—432                                    4 Claims

ABSTRACT OF THE DISCLOSURE

A catalyst useful for the oxidation of organic compounds, particularly the partial oxidation of benzene with molecular oxygen to produce maleic anhydride, comprises the oxides of molybdenum and vanadium and a minor amount of boron. A preferred form of the catalyst further includes phosphorus and at least one member of the group consisting of cobalt, nickel and iron, and sodium.

---

This invention relates to catalysts and is more particularly concerned with catalysts which are useful in the oxidation of organic compounds, especially the partial oxidation of benzene with molecular oxygen to produce maleic anhydride. The invention is also concerned with the use of such catalysts in oxidations of this character.

The preparation of maleic anhydride by the selective partial oxidation of benzene in a vapor phase system using a contact catalyst involves a well-known reaction and has been practiced commercially for many years. Among catalysts which have been found useful and effective commercially for this purpose are those based upon a combination of vanadium and molybdenum in oxidized form. In the development of improved catalysts of this nature the vanadium and molybdenum oxides have been combined with the oxidized forms of one or more other metals of various types.

Known commercial catalysts of this character are effective and generally satisfactory, but in the field of catalysis there is always a continuing search for improved catalyst compositions, and a particular objective is the discovery of means for increasing the activity of the catalysts while at the same time enhancing, or at least maintaining, the selectivity of the catalyst in favor of the desired product. Of particular interest to persons skilled in this art is the development of means for increasing or prolonging the active life of the catalyst. There are obvious important practical benefits in a catalyst which is active and retains its activity for a long period of time before it needs to be replaced.

It is accordingly an object of this invention to provide an improved catalyst of the vanadium oxide-molybdenum oxide type which has an increased active life.

It is a further objective of the invention to provide a catalyst of the character indicated which has desirable activity and selectivity characteristics.

It is a more specific object of the invention to provide a catalyst which has an increased active life and has high activity and selectivity with respect to the production of maleic anhydride by the partial oxidation of benzene.

Another object of the invention is to provide an improved method for the partial catalytic oxidation of benzene to produce maleic anhydride which employs a catalyst of the type described.

In accordance with the invention it has been discovered that the combination, in a catalyst of the vanadium oxide-molybdenum oxide type, of a small amount of boron, preferably incorporated in the form of a sodium borate, provides a catalyst having an increased active life and having desirable activity and selectivity in the production of maleic anhydride by the partial oxidation of benzene. In one sense the boron, when combined with the other components of the catalyst, can be characterized as an activity stabilizer, i.e. it prolongs the period during which the catalyst remains economically active when it is employed in the oxidation of organic compounds.

Improved results are observed even when boron is the only additive in the vanadium oxide-molybdenum oxide catalyst system and the active catalyst composition consists only of the vanadium oxide-molybdenum oxide combination in addition to the boron value. However, from the standpoint of optimum benefits and catalyst effectiveness, it is preferred that the boron be used in vanadium oxide-molybdenum oxide catalyst compositions of the type which contain other components which have been found to enhance the activity of catalyst systems of this nature, as disclosed, for example, in Egbert and Becker U.S. Pat. 2,777,860 and Egbert U.S. Pat. 3,211,671. Thus, it is advantageous that the catalyst also contain phosphorus, and cobalt, iron or nickel, or mixtures thereof. In addition, it is advantageous to have present a small amount of sodium and, as indicated above, the boron is suitably employed in making the catalyst of the invention in the form of a sodium borate, so that the use of this compound will incorporate not only the essential boron value into the composition, but will also provide an effective quantity of sodium.

In the catalyst composition of the invention, all of the metals mentioned are believed to be in the form of oxides, e.g. $V_2O_5$, $MoO_3$, $P_2O_5$, $Na_2O$, $Co_2O_3$, $Ni_2O_3$, $Fe_2O_3$, and $B_2O_3$, since the catalyst is advantageously prepared by means of known techniques which involve "activation" by a prolonged heat treatment as a concluding step. However, it is convenient to refer to the proportions of the various components in terms of the metal elements. In this way, the catalyst of the invention can be characterized by its analytical composition in which the components are expressed in meaningful terms without regard to the exact chemical composition or form in which they may actually exist. Thus, basing the proportions on a molar quantity of vanadium as 1.0, the molybdenum may be in the range of 0.1 to 0.95 mol, the phosphorus content may be in the range of 0.01 to 0.5 mol, the alkali metal content may be in the range of 0.02 to 0.6 mol, the content of the Co, Ni, or Fe may be in the range of 0.005 to 0.05 mol, and the boron may be in the range of 0.005 to 0.3 mol. As is customary in the case of vanadium oxide-molybdenum oxide oxidation catalysts, the active catalytic components are supported upon a suitable carrier, generally in the form of refractory inorganic particles, of any of the various catalyst supports known to this art, conventionally characterized as inert, having a surface area of at most 5 square meters per gram, e.g. 0.002 to 5 square meters per gram, preferably 0.005 to 3 square meters per gram, and of a particle size adapted for the particular process in which the catalyst is to be used. Generally suitable are particles having an average diameter of about ⅛–½ inch, although larger or smaller particle sizes can also be employed, e.g. average diameters of ⅛–¾ inch.

The weight of catalyst mixture relative to the support may be in the range of 1.0 to 20%, preferably about 10% based on the weight of the support. Although alumina is a preferred support, other refractory support materials may be used, such as silicon carbide, silica, titania, fuller's earth, pumice, asbestos, kieselguhr, and the like. The carrier material may be in the form of pellets, lumps, granules, spheres, rings or other formed pieces, or in other forms which may be of regular or irregular contour.

It is appreciated that boron, generally in the form of a boron oxide, has been used in catalysts for the partial oxidation of organic compounds to maleic anhydride as disclosed, for example, in Hartig U.S. Pats. Nos. 2,625,519 and 2,691,660. However, in such prior operations, the boron oxide has been used as an equivalent of, or as a substitute for, a phosphorous oxide or a vanadium oxide. In accordance with the present invention, in contrast, boron is used in addition to the vanadium oxide and the phosphorous oxide and in this environment, wherein the boron is present in a small amount in relation to vanadium, it exhibits the life-prolonging, selectivity and activity-enhancing action previously mentioned.

When the catalyst of this invention is used in the vapor-phase partial oxidation of benzene to form maleic anhydride, the oxidation conditions employed are those generally associated with this reaction, as disclosed, for example, in U.S. 2,777,860 and 3,211,671. Typical conditions involve jacket temperatures of 340 to 420° C., a ratio of benzene to molecular oxygen: 1–1.6 to 20 (mol), and a space velocity of 2000 to 4000 hour$^{-1}$ and pressures of atmospheric to 3 atm. Similarly, conventional reactors or converters can be employed and the processes in which the catalyst of the invention can be used are, therefore, not restricted to particular conditions or types of apparatus. However, it is one of the features of the catalyst of this invention that the partial oxidation of benzene to maleic anhydride can be carried out at lower temperatures than would normally be employed with a corresponding catalyst having no boron content, all other conditions being the same.

As mentioned, the catalyst is suitably prepared by more or less conventional techniques. In a preferred procedure, for example, the molybdenum, in the form of ammonium molybdate, is dissolved in concentrated aqueous HCl (35%) followed by the addition of boron, in the form of hydrated sodium tetraborate, as a solution in hot water. Ammonium metavanadate is dissolved in concentrated HCl and added to the first HCl solution with stirring. When a phosphorus value is to be included, it is added, e.g. as hydrated disodium acid phosphate, as a solution in hot water to the first-named HCl solution, and when Co, Ni and/or Fe are to be incorporated a water-soluble salt of the metal, e.g. cobalt nitrate hexahydrate, is dissolved in water and the resulting aqueous solution is added to the ammonium metavanadate solution. The two HCl solutions are then mixed by slowly adding the molybdate solution to the metavanadate solution and the combined solution mixed with particles of a suitable refractory carrier and evaporated, resulting in the disposition of the salts on the surface and in the pores of the carrier. The coated carrier particles are then activated by calcining them in a kiln or oven, or in a tube through which air is passed, at an elevated temperature (e.g. 175–400° C.) for ½ to 2 hours. Since the preferred form of the catalyst of this invention is related to the catalyst disclosed in U.S. Pats. 2,777,860 and 3,211,671, the catalyst preparation methods disclosed in those patents, with the further addition of the boron compound are suitably employed.

While, as mentioned, the invention in its broadest sense is not limited to a particular carrier material, a support is preferred which has an apparent porosity (pore volume) of at least 35%, a surface area (square meters per gram) of about 0.01 to about 1, and a major pore diameter range of 50 to 1500 microns, preferably at least 80% of 50 to 1500 micron size. An alumina support having these characteristics is preferred, especially an alumina-silica support containing up to about 20% silica, the balance being substantially alumina. Particularly good results are obtained with a support of the character indicated which has an apparent porosity of at least 50%, and a pore diameter range of at least 95% of 50–1500 micron size.

The features of the invention will be more readily apparent from the following specific examples of typical application. It will be understood, however, that these examples are for the purpose of illustration only and are not to be interpreted as limiting the invention.

EXAMPLE I

A first solution is prepared by dissolving 103 g. of ammonium molybdate in 1000 ml. of conc. hydrochloric acid, and then 8.6 g. sodium borate pentahydrate in 75 ml. hot water (75° C.) is added to the solution with stirring, followed by addition of 10.5 g. disodium acid phosphate in heptahydrate in 25 ml. hot water. A second solution is prepared by dissolving 167 g. ammonium metavanadate slowly in 500 ml. of conc. hydrochloric acid followed by the addition of 8.8 g. cobalt nitrate hexahydrate in 25 ml. of water (25° C.). The first solution is then slowly added to the second solution with stirring and the resultant brown mixture poured over 1500 ml. of 3–5 mesh aggregate pellets of a commercial alumina catalyst carrier composed of about 85% $Al_2O_3$, about 13.5% $SiO_2$, and very small amounts of other oxides as impurities, primarily alkali metal oxides and alkaline earth metal oxides. This carrier has an apparent porosity of about 55–60%, a surface area of about 0.1 sq. meters per gram and a pore diameter range of about 95% of 50–1500 micron size. The mixture is heated in a rotating beaker to evaporate the solution to dryness, leaving a greenish coated product which is then placed in an activation oven for two hours at 400° C. to activate it, the metals thereby being converted into their oxides. In similar manner, there are prepared a series of other catalysts, supported on the alumina carrier, each containing a combination of vanadium, molybdenum, phosphorous, sodium, nickel, cobalt or iron and boron within the scope of the formulation set forth above, but formed from varying quantities of precursor salts or employing different precursor salts.

In order to evaluate the foregoing catalysts, each is used to form a catalyst bed in a series of runs wherein benzene is partially oxidized by means of molecular oxygen to maleic anhydride. For this purpose, each catalyst is charged into a vertical reactor tube of 0.9 inch internal diameter, to a bed height of 120 inches, surrounded with a temperature regulating medium such as salt contained in a heating jacket. A benzene-air mixture is fed downwardly through the reactor at a linear velocity of one foot per second calculated at reaction conditions. The feed mixture contains 1.4 mol percent of benzene in air, and the jacket temperature is maintained in the range of 360 to 375° C. The product is recovered in known manner. The results obtained with each of the catalysts are shown in the following table wherein catalyst No. 1 is the catalyst prepared in the manner described at the beginning of this example. Catalyst No. 2 is like catalyst No. 1, except that the amount of ammonium molybdate is increased to 116 g., and 15.1 g. trisodium phosphate ($Na_3PO_4 \cdot 12H_2O$) and 11.4 g. $Na_2B_4O_7 \cdot 10H_2O$ (sodium tetraborate) are used instead of disodium acid phosphate and sodium borate pentahydrate. Catalyst No. 3 is identical with catalyst No. 2, except that 8.8 g. nickel nitrate ($Ni(NO_3)_2 \cdot 6H_2O$) is used instead of cobalt nitrate. Catalyst No. 4 is formed from 167 g. ammonium vanadate, 106 g. ammonium molybdate, 14.1 g. disodium acid phosphate, 7.55 g. cobalt nitrate, 2.54 g. nickel nitrate and 9.6 g. sodium tetraborate. Catalyst No. 5 is formed from 167 g. ammonium vanadate, 128 g. ammonium molybdate, 16.6 trisodium phosphate, 10.3 g. sodium tetraborate, 8.8 g. nickel nitrate, and 4 g. $Fe(NO_3)_3$. Catalyst No. 6 is the same as catalyst No. 2 except that 10.2 g. $Na_2HPO_4 \cdot 7H_2O$ is used instead of trisodium phosphate. Catalyst No. 7 is also like catalyst No. 1 but is formed from 4.55 g. 85% phosphoric acid instead of disodium acid phosphate and also from 3.04 g. NaCl.

TABLE I

| Catalyst | Temperature, °C. | Selectivity, mol percent | Weight percent of— Conversion | Yield |
|---|---|---|---|---|
| 1 | 363 | 76 | 99 | 95 |
| 2 | 364 | 77 | 97 | 94 |
| 3 | 368 | 76 | 97 | 92 |
| 4 | 365 | 76 | 98 | 94 |
| 5 | 367 | 76 | 98 | 92 |
| 6 | 372 | 76 | 99 | 95 |
| 7 | 372 | 76 | 99 | 95 |

While, as mentioned, the introduction of a boron value into a vanadium oxide-molybdenum oxide catalyst system is of particular interest from a commercial standpoint when the catalyst system also contains phosphorus, sodium and cobalt, nickel or iron values, the effect of the boron value can be observed in the case of this class of catalyst in which only vanadium oxide and molybdenum oxide are present in addition to the boron value or in which only one of the above mentioned additional additives is added to the combination. This is demonstrated by the following experiments in which the procedure described in Example I is used to prepare a catalyst "A" from 167 g. ammonium vanadate and 128 g. ammonium molybdate, a catalyst "B" from 167 g. ammonium vanadate and 106 g. ammonium molybdate and 11.4 g. $Na_2B_4O_7 \cdot 10H_2O$, a catalyst "C" from 167 g. ammonium vanadate, 106 g. ammonium molybdate and 7.6 g. $Na_3PO_4 \cdot 12H_2O$, and a catalyst "D" employing the same precursors as in catalyst "C" but, in addition, including 11.4 g. $Na_2B_4O_7 \cdot 10H_2O$. When these catalyst are evaluated in the preparation of maleic anhydride from benzene in accordance with the procedure described above, the following results are obtained:

TABLE II

| Catalyst | Temperature, °C. | Selectivity, mol percent | Weight percent of— Conversion | Yield |
|---|---|---|---|---|
| A | 375 | 53 | 22 | 15 |
| B | 366 | 61 | 99 | 76 |
| C | 375 | 69 | 56 | 48 |
| D | 368 | 71 | 100 | 89 |

As pointed out above, one of the characteristics of the catalyst of this invention is prolonged active life. This is clearly demonstrated by comparing a typical catalyst in accordance with the invention which is characterized by a small but effective content of boron with an analogous catalyst which is free from boron in the actual vapor-phase partial oxidation of benzene to maleic anhydride in an accelerated testing system in which the effect of several months of operation can be reduced to a matter of hours.

In the accelerated test, the operating conditions observed correspond to those described in Example I, except that a temperature of 440° C. is used, but the temperature is reduced to 370° C. at repeated intervals to measure the activity (conversion) at the latter temperature.

Using this accelerated method, it is found that in a typical case, a catalyst containing boron in accordance with this invention, e.g. corresponding to catalyst No. 4 described above, exhibits a significantly increased active life in comparison with an analogous catalyst having no boron content.

The embodiments of the invention in which an exclusive property is claimed are defined as follows:

1. A catalyst composition suitable for the vapor-phase oxidation of benzene to maleic anhydride consisting essentially of oxides of molybdenum, vanadium, boron, and an oxide of at least one member of the group consisting of phosphorus, cobalt, nickel, iron and sodium, the relative amounts of said oxides, expressed as V, Mo, B, P, Co, Ni, Fe and Na being, per mol of V, 0.1 to 0.95 mol Mo, 0.005 to 0.3 mol B, up to 0.5 mol P, up to 0.6 mol Na, up to 0.05 mol Co, up to 0.05 mol Ni and up to 0.05 mol Fe.

2. A catalyst as defined in claim 1, containing 0.01 to 0.5 mol phosphorus.

3. A catalyst as defined in claim 2, containing 0.02 to 0.6 mol sodium and 0.005 to 0.05 mol of at least one member of the group consisting of cobalt, nickel and iron.

4. In a molybdenum oxide-vanadium oxide-phosphorus oxide catalyst for the vapor-phase oxidation of benzene to maleic anhydride, wherein said molybdenum oxide, vanadium oxide and phosphorus oxide, expressed as Mo, V and P, are present per mol of V in the amount of 0.1 to 0.95 mol Mo and 0.01 to 0.5 mol P, the improvement which consists essentially of the combination with said catalyst of a small amount of boron oxide effective to prolong the active life of said catalyst.

References Cited

UNITED STATES PATENTS

| 3,535,346 | 10/1970 | Sudo et al. | 252—432 X |
| 3,567,772 | 3/1971 | Yanagita et al. | 252—432 X |
| 2,777,860 | 1/1957 | Egbert et al. | 252—435 X |
| 2,625,519 | 1/1953 | Hartig | 252—432 |
| 2,691,660 | 10/1954 | Hartig | 252—432 X |
| 3,087,964 | 4/1963 | Koch et al. | 252—432 X |
| 3,579,559 | 5/1971 | Unger | 252—432 X |

PATRICK P. GARVIN, Primary Examiner

U.S. Cl. X.R.

260—346.4